United States Patent
Gima

(10) Patent No.: US 12,459,239 B2
(45) Date of Patent: Nov. 4, 2025

(54) LAMINATED GLASS

(71) Applicant: AGC Inc., Tokyo (JP)

(72) Inventor: Yuhei Gima, Tokyo (JP)

(73) Assignee: AGC Inc., Tokyo (JP)

( * ) Notice: Subject to any disclaimer, the term of this patent is extended or adjusted under 35 U.S.C. 154(b) by 673 days.

(21) Appl. No.: 17/661,081

(22) Filed: Apr. 28, 2022

(65) Prior Publication Data

US 2022/0250359 A1 Aug. 11, 2022

Related U.S. Application Data

(63) Continuation of application No. PCT/JP2020/041514, filed on Nov. 6, 2020.

(30) Foreign Application Priority Data

Nov. 15, 2019 (JP) .................................. 2019-206824

(51) Int. Cl.
   *B32B 17/10* (2006.01)
(52) U.S. Cl.
   CPC .. *B32B 17/10495* (2013.01); *B32B 17/10036* (2013.01); *B32B 17/10183* (2013.01);
   (Continued)
(58) Field of Classification Search
   CPC ........ B32B 17/10495; B32B 17/10036; B32B 17/10183; B32B 17/1022;
   (Continued)

(56) References Cited

U.S. PATENT DOCUMENTS 7,617,964 B2 * 11/2009 Winter ............. B32B 17/10761
   219/202
2009/0115922 A1 * 5/2009 Veerasamy ......... C03C 17/3681
   349/16

(Continued)

FOREIGN PATENT DOCUMENTS

JP   2007-326763 A   12/2007
JP   4060249 B2     3/2008

(Continued)

*Primary Examiner* — Thomas K Pham
*Assistant Examiner* — Justin W. Hustoft
(74) *Attorney, Agent, or Firm* — Oblon, McClelland, Maier & Neustadt, L.L.P.

(57) ABSTRACT

A laminated glass includes a pair of glass plates, an interlayer film, and a functional element contacting with the interlayer film, and including conductive films, electrodes, an electrode section, a non-electrode section, a first reference surface, and a second reference surface. When an average value of a height of the electrode section is denoted as t1, an average value of a height of the electrode section as t2, and a length in a crosswise direction of the one of the electrodes as w, $0 \le w \times t1 \le 0.7$, $0 \le w \times t2 \le 0.7$, and $3 \le w \le 20$ are satisfied. The functional element is a light control element or an electric heating element, the light control element including: substrates on which conductive films are formed, and a light control layer made of any one or more selected from a group consisting of a suspended particle device, a guest-host liquid crystal, a photochromic material, an electrochromic material, and an electrokinetic material.

18 Claims, 10 Drawing Sheets

(52) U.S. Cl.
CPC .... *B32B 17/1022* (2013.01); *B32B 17/10568* (2013.01); *B32B 2307/202* (2013.01); *B32B 2307/412* (2013.01); *B32B 2307/732* (2013.01)

(58) Field of Classification Search
CPC ........ B32B 17/10568; B32B 17/10174; B32B 17/10293; B32B 17/10504; B32B 17/10513; B32B 17/10532; B32B 2307/202; B32B 2307/412; B32B 2307/732; B32B 2250/04; B32B 2250/40; B60J 1/00
See application file for complete search history.

(56) References Cited

U.S. PATENT DOCUMENTS

| | | | |
|---|---|---|---|
| 2013/0265511 A1* | 10/2013 | Poix | B32B 17/10045 349/33 |
| 2016/0361905 A1* | 12/2016 | Yamaguchi | C03C 27/10 |
| 2019/0160920 A1* | 5/2019 | Miyasaka | B32B 17/06 |
| 2021/0242674 A1 | 8/2021 | Manz et al. | |

FOREIGN PATENT DOCUMENTS

| | | | | |
|---|---|---|---|---|
| JP | 6065221 B2 | 1/2017 | | |
| WO | WO-2019068419 A1 * | 4/2019 | ....... | B32B 17/10036 |
| WO | WO 2019/206561 A1 | 10/2019 | | |

* cited by examiner

FIG.10

| | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 |
|---|---|---|---|---|---|---|---|---|---|---|
| w [mm] | 10 | 10 | 5 | 10 | 10 | 10 | 7 | 7 | 20 | 20 |
| t1 [mm] | 0.0375 | 0.1 | 0.125 | 0.125 | 0.0375 | 0.13 | 0.1 | 0.125 | 0.025 | 0.0375 |
| t2 [mm] | 0 | 0 | 0 | 0 | 0 | 0 | 0 | 0 | 0 | 0 |
| w × t1 | 0.375 | 1 | 0.625 | 1.25 | 0.375 | 1.3 | 0.7 | 0.875 | 0.5 | 0.75 |
| w × t2 | 0 | 0 | 0 | 0 | 0 | 0 | 0 | 0 | 0 | 0 |
| FOAMING/AIR RESIDUE IN INTERLAYER FILM | GOOD | POOR | GOOD | POOR | GOOD | POOR | GOOD | POOR | GOOD | POOR |

FIG.11

| | EXAMPLE 11 | EXAMPLE 12 | EXAMPLE 13 |
|---|---|---|---|
| w [mm] | 6 | 6 | 6 |
| t1 [mm] | 0.07 | 0.07 | 0.21 |
| t2 [mm] | 0 | 0 | 0 |
| w × t1 | 0.42 | 0.42 | 1.26 |
| w × t2 | 0 | 0 | 0 |
| wx | 3 | 5 | 5 |
| t3 [mm] | 0.07 | 0.07 | 0.21 |
| t4 [mm] | 0.22 | 0.22 | 0.22 |
| FOAMING/AIR RESIDUE IN INTERLAYER FILM | GOOD | GOOD | POOR | ously been improved by the known counter—

LAMINATED GLASS

CROSS-REFERENCE TO RELATED APPLICATIONS

This application is a continuation of International Application PCT/JP2020/041514, filed on Nov. 6, 2020 and designated the U.S., which is based on and claims priority to Japanese Patent Application No. 2019-206824 filed on Nov. 15, 2019, with the Japan Patent Office. The entire contents of these applications are incorporated herein by reference.

BACKGROUND OF THE INVENTION

1. Field of the Invention

The present disclosure relates to a laminated glass.

2. Description of the Related Art

As a window glass for an automobile and a train, a laminated glass is known, in which functional elements that can be energized are enclosed in an interlayer film. Examples of functional elements include a light control element or an electric heating element. In general, electrodes to energize a functional layer are formed on these functional elements and the electrodes are enclosed in the laminated glass along with a functional layer.

However, when electrodes are encapsulated in the laminated glass, the thickness differs between a part of the functional element formed with the electrodes and a part of the functional element without the electrodes. This difference may reduce a degassing property during manufacturing the laminated glass, and may cause defects in appearance, such as air residue and foaming in the interlayer film.

As a countermeasure for reduction of the degassing property, for example, it has been studied to alleviate stress concentration on an electrode connection wiring by increasing the thickness of an electrode (See Patent Literature 1, for example). Adjusting the thickness difference of the functional layer by devising composition of an interlayer film has also been studied (See Patent Literature 2, for example).

However, the degassing property around the electrodes has not sufficiently been improved by the known countermeasure.

The present disclosure is made in view of such a background and it is an object of the present disclosure to improve a degassing property around electrodes in a laminated glass in which a functional element is enclosed in an interlayer film.

CITATION LIST

Patent Literature

[PTD 1] Japanese Patent No. 4060249
[PTD 2] Japanese Laid-open Patent Publication No. 2007-326763

SUMMARY OF THE INVENTION

The laminated glass includes a pair of glass plates, an interlayer film located between the pair of glass plates, and a functional element located between the pair of glass plates and being in contact with the interlayer film, wherein the functional element includes one or more conductive films and one or more electrodes electrically connected to the conductive films. The functional element includes an electrode section in which a given one of the electrodes is formed and a non-electrode section in which none of the electrodes is formed. The functional element includes a first reference surface and a second reference surface in the non-electrode section, the first reference surface being in contact with the interlayer film on a side where one glass plate of the pair of glass plates is situated, and a second reference surface being in contact with the interlayer film on a side where the other glass plate of the pair of glass plates is situated. When an average value of a height of the electrode section with respect to the first reference surface is denoted as t1 [mm], an average value of a height of the electrode section with respect to the second reference surface is denoted as t2 [mm], with a length in a crosswise direction of the one of the electrodes being denoted as w [mm], $0 \leq w \times t1 \leq 0.7$, and $0 \leq w \times t2 \leq 0.7$ (and also $3 \leq w \leq 20$) are satisfied. The functional element is a light control element or an electric heating element, wherein the light control element includes substrates which are arranged in an opposing fashion and on which conductive films are formed, and a light control layer arranged between the opposing substrates and made of any one or more selected from a group consisting of a suspended particle device, a guest-host liquid crystal, a photochromic material, an electrochromic material, and an electrokinetic material.

According to at least one embodiment of the present disclosure, the degassing property around electrodes can be improved in the laminated glass with a functional element enclosed in an interlayer film.

BRIEF DESCRIPTION OF THE DRAWINGS

FIG. 10 is a drawing (1) illustrating examples of embodiments and comparative examples;
and
FIG. 11 is a drawing (2) illustrating examples of embodiments and comparative examples.

DESCRIPTION OF THE PREFERRED EMBODIMENTS

Hereinafter, an embodiment of the present disclosure is described with reference to the drawings. In each drawing, the same components are marked with the same sign, and redundant explanations may be omitted. In each drawing, some of the sizes and shapes may be exaggerated to make the subject matter of the present disclosure easier to understand.

A "vehicle" typically refers to an automobile, but also refers to any moving object with a glass, including trains, ships, aircraft, or the like.

"Planar view" refers to viewing a given area of the laminated glass in a direction normal to a surface of the laminated glass inside a vehicle. "Planar shape" refers to a shape viewing a given area of the laminated glass in a direction normal to a surface of the laminated glass inside a vehicle.

First Embodiment

Figure 1A:
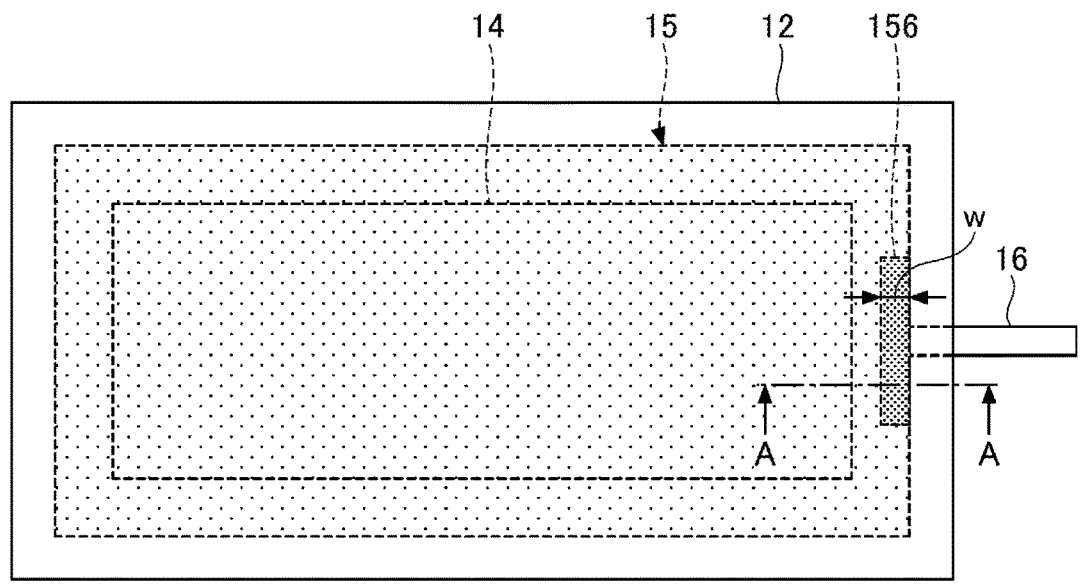
FIGS. 1A and 1B are drawings illustrating a laminated glass according to a first embodiment.
Figure 1B:
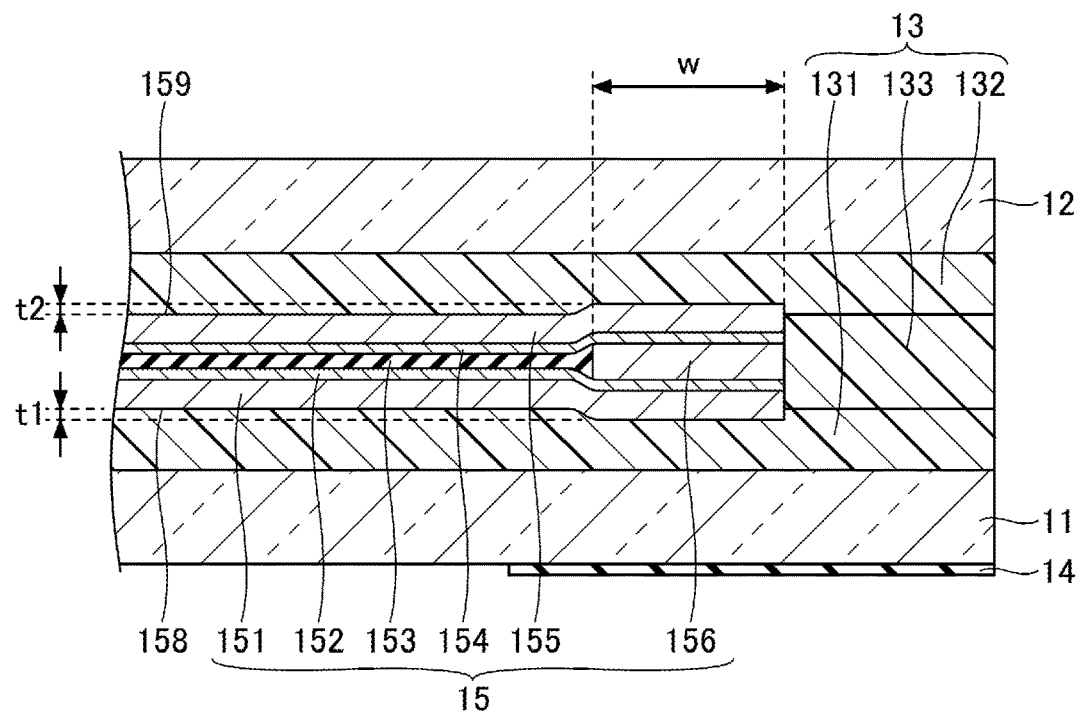

FIGS. 1A and 1B illustrate a laminated glass according to the first embodiment. FIG. 1A schematically shows the laminated glass installed in a vehicle, viewing inside the vehicle from outside of the vehicle. FIG. 1B is a partially enlarged cross-sectional view along line A-A in FIG. 1A.

Referring to FIGS. 1A and 1B, the laminated glass 10 is a laminated glass for a vehicle, including a glass plate 11, a glass plate 12, an interlayer film 13, a shielding layer 14, and a light control element 15. However, the shielding layer 14 is provided as appropriate.

In FIGS. 1A and 1B, the laminated glass 10 is shown in a shape of a flat plate, but the laminated glass 10 may be curved in a longitudinal direction and in a crosswise direction. Alternatively, the laminated glass 10 may be curved only in the longitudinal direction or in the crosswise direction.

In FIGS. 1A and 1B, the laminated glass 10 is rectangular, but shapes of the laminated glass 10 are not limited to rectangular shapes in a plan view, and the laminated glass 10 can have any shape including trapezoid.

The laminated glass 10 can be applied, for example, to a roof glass, a rear glass, a rear side glass, a rear quarter glass, a roof glass, and an extra glass etc. for a vehicle. The extra glass is a glass that is attached to the rear side of the vehicle to improve backward viewability for a driver of the vehicle.

The glass plate 11 is an interior glass plate located inside a vehicle when the laminated glass 10 is installed in the vehicle. The glass plate 12 is an exterior glass plate located outside a vehicle when the laminated glass 10 is installed in the vehicle. The glass plates 11 and 12 may have a predetermined curvature.

The glass plates 11 and 12 are a pair of opposing glass plates, and the interlayer film 13 and the light control element 15 are located between the pair of glass plates. The glass plates 11 and 12 are adhered to each other in a state that the interlayer film 13 and the light control element 15 are sandwiched between them.

The interlayer film 13 is a film that bonds the glass plate 11 and the glass plate 12. The interlayer film 13 includes, for example, an interlayer film 131 bonded with the glass plate 11, an interlayer film 132 bonded with the glass plate 12, and a frame-like interlayer film 133 which is arranged between the interlayer film 131 and the interlayer film 132 and surrounding the periphery of the light control element 15.

However, it is also possible that the interlayer film 13 includes an interlayer film 131 bonded with the glass plate 11 and an interlayer film 132 bonded with the glass plate 12, but may not include an interlayer film 133. Even in a case of the laminate glass 10 not including an interlayer film 133, the periphery of the light control element 15 is surrounded by the interlayer film 131 and/or the interlayer film 132 during pressure bonding in a manufacturing process of the laminated glass 10.

When it is not necessary to distinguish the interlayer films 131, 132, and 133, they are simply referred to as "interlayer film 13". The glass plate 11, the glass plate 12, and the interlayer film 13 will be described in detail below.

A shielding layer 14 is an opaque layer that can be a strip provided along an edge of the laminated glass 10, for example. The shielding layer 14 is, for example, an opaque (e.g., black) colored ceramic layer. The shielding layer 14 can be a colored interlayer film or a colored film with a lightproof property, or a combination of a colored interlayer film and a colored ceramic layer. The colored film can be integrated with an infrared reflecting film or the like.

Providing an opaque shielding layer 14 in the laminated glass 10 prevents a resin, such as urethane for holding an edge of the laminated glass 10 to a car body, from deteriorating by ultraviolet light. Further, the electrodes electrically connected to the light control element 15 and electrode connection wirings can be concealed so that they are not easily visible from outside and/or inside of the vehicle.

To form a shielding layer 14, for example, a colored ceramic paste including a fusible glass frit that contains a black pigment is applied to a glass plate by screen printing or the like and fired, but not limited thereto. The shielding layer 14 can be formed, for example, by application of an organic ink containing a black or a dark pigment to a glass plate by screen printing or the like and drying.

In an example shown in FIGS. 1A and 1B, the shielding layer 14 is provided on the edge of the interior surface of the glass plate 11. However, the shielding layer 14 may be provided on the edge of the interior surface of the glass plate 12, or it may be provided on both edge of the interior surface of the glass plate 11 and edge of the interior surface of the glass plate 12, as appropriate.

The light control element 15 is an element that can change the light transmittance of the laminated glass 10. The light control element 15 may be arranged approximately on the entire laminated glass 10, or only a part of it, as appropriate. The shape of the light control element 15 in a plan view is, for example, a rectangle that is smaller than the shape of the laminated glass 10 in a plan view. In the example shown in FIGS. 1A and 1B, the edge of the light control element 15 is arranged as it overlaps with the shielding layer 14 in a planar view.

The light control element 15 includes a substrate 151, a conductive film 152, a light control layer 153, a conductive film 154, a substrate 155, and an electrode 156. The light control element 15 is enclosed in the interlayer film 13. In other words, the light control element 15 is surrounded by the interlayer film 13.

The light control element 15 is, for example, formed in a shape of a film. The thickness of the light control element 15 is, for example, greater than or equal to 0.05 mm and less than or equal to 0.5 mm, and preferably greater than or equal to 0.1 mm and less than or equal to 0.4 mm. An electrode connection wiring 16 is connected to the electrode 156 of the light control element 15 to connect the electrode 156 to an external circuit.

The substrates 151 and 155 are a transparent resin layer. The thickness of the substrates 151 and 155 is, for example, greater than or equal to 5 µm and less than or equal to 500 µm, preferably greater than or equal to 10 µm and less than or equal to 200 µm, and more preferably greater than or equal to 50 µm and less than or equal to 150 µm.

The substrates 151 and 155 can be formed, for example, by any one selected from a group consisting of polyethylene terephthalate, polyethylene naphthalate, polyamide, polyether polysulfone, polyethersulfone, polycarbonate, polyarylate, polyetherimide, polyetheretherketone, polyimide, aramid, polybutylene terephthalate, triacetyl cellulose, polyurethane, and cycloolefin polymers.

The conductive film 152 is formed on the surface of the substrate 151 that faces the glass plate 12 and is in contact with the surface of the light control layer 153 that faces the glass plate 11. The conductive film 154 is formed on the surface of the substrate 155 that faces the glass plate 11 and is in contact with the surface of the light control layer 153 that faces the glass plate 12. In other words, the conductive films 152 and 154 are a pair of conductive films interposed by the light control layer 153.

For example, transparent conductive oxide (TCO) can be used for the conductive films 152 and 154. Examples of TCOs, may include tin-doped indium oxide (ITO) and aluminum-doped zinc oxide (AZO) but are not limited thereto.

Transparent conductive polymers such as poly(3,4-ethylenedioxythiophene) (PEDOT) or poly(4,4-dioctylcyclopentadithiophene) can be preferably used for the conductive films 152 and 154. A stacked film of metal layers and dielectric layers, a silver nanowire, or a metal mesh of silver or copper etc. can be also used for the conductive films 152 and 154.

The conductive films 152 and 154 can be formed by physical vapor deposition (PVD), such as sputtering, vacuum deposition, and ion plating. The conductive films 152 and 154 may be formed by chemical vapor deposition (CVD) or wet coating.

The light control layer 153 is sandwiched between the substrate 151 on which the conductive film 152 is formed and the substrate 155 on which the conductive film 154 is formed. For example, the light control layer 153 can be any one or more selected from a group consisting of a suspended particle device (SPD), a guest-host liquid crystal, a photochromic material, an electrochromic material, and an electrokinetic material.

In other words, the light control element 15 includes the substrate 151 on which the conductive film 152 is formed and the substrate 155 on which the conductive film 154 is formed, both substrates being arranged in an opposing fashion; and the light control layer 153 made of any one or more selected from a group consisting of a suspended particle device, a guest-host liquid crystal, a photochromic material, an electrochromic material, or an electrokinetic material arranged between the conductive film 152 and the conductive film 154 that are arranged in an opposing fashion.

As a suspended particle device, a common SPD film can be used that is configured in a way that a polymer layer containing suspended particles that can be oriented by applying a voltage is interposed by two substrates, the inside of which are coated with the conductive film. When a power switch is turned on to apply a voltage between the transparent conductive films, the suspended particles in the polymer layer are oriented, so that such an SPD film will be in a state with high transparency and high visible light transmittance. When the power switch is turned off, the suspended particles in the polymer layer are not oriented, so that the SPD film will be in a state with low transparency and low visible light transmittance.

As an SPD film, for example, LCF-1103DHA (product name, manufactured by Hitachi Chemical Co., Ltd.), and other commercially available products can be used. Since these commercially available products are supplied in a predetermined size, they are cut into a desired size for use. The thickness of the SPD film is not particularly limited, but preferably greater than or equal to 0.1 mm and less than or equal to 0.4 mm in terms of easy handling and availability.

The electrode 156 is arranged, for example, at a position overlapping with a shielding layer 14 in planar view. In this embodiment, the electrode 156 is inserted between the conductive film 152 and the conductive film 154. The first main surface and the second main surface of the electrode 156 are in contact with a film other than the interlayer film 13. The first major surface of the electrode 156 is a surface facing the glass plate 11. The second main surface of the electrode 156 is an opposite surface of the first main surface that faces the glass plate 12.

The electrode 156 is electrically separated into upper and lower parts by an insulating layer (not illustrated), and one of the upper and lower parts is electrically connected to the conductive film 152 and the other one of the upper and lower parts is electrically connected to the conductive film 154. The light control layer 153 is driven by energizing the conductive films 152 and 154. In other words, the first main surface of the electrode 156 is in contact with the conductive film 152, and the second main surface of the electrode 156 is in contact with the conductive film 154.

One of the poles of the electrode 156, for example, a positive pole, is connected to a positive side of a power source such as a battery installed in a vehicle via the electrode connection wiring 16 that is electrically connected to the one of the poles of the electrode 156. The other one of the poles of the electrode 156, for example, a negative pole, is connected to a negative side of the power source such as a battery installed in the vehicle via the electrode connection wiring 16 that is electrically connected to the other one of the poles of the electrode 156.

When a voltage is supplied to the light control layer 153 from the power source such as a battery via the electrodes 156, the transmittance of the light control layer 153 is changed depending on the voltage.

The materials of the electrode 156 are not particularly limited as long as they are a conductive material, but examples of the materials of the electrode 156 may include a metallic material. Examples of metallic materials may include gold, silver, copper, aluminum, tungsten, platinum, palladium, nickel, cobalt, titanium, iridium, zinc, magnesium, or tin. These metals may also be plated or configured as an alloy or a composite with a resin.

For the electrode 156, a copper ribbon or a flat braided copper wire, or an FPC (Flexible Printed Circuit) can be preferably used in terms of cost and availability. The copper ribbon or the flat braided copper wire may be plated with a metal other than copper.

The electrode 156 can be bonded to the conductive films 152 and 154 by a conductive adhesive (conductive bonding layer), an anisotropic conductive film, or a solder. The electrode 156 can be directly contacted with the conductive films 152 and 154 without a conductive adhesive, an anisotropic conductive film, or a solder. Alternatively, the electrodes 156 may be formed by a printing method such as screen printing, inkjet printing, offset printing, flexographic printing, or gravure printing.

The electrode 156 has a sufficient length and a shape to energize the light control element 15. The shapes of the electrode 156 are not particularly limited, but in general, they are approximately rectangular. As it is necessary to conceal the electrode 156 by a shielding layer 14, the electrode 156 is arranged, for example, approximately in parallel with the edge of the glass plates 11 and 12 at either end of the light control element 15 in a longitudinal direction (on one of short sides).

The electrode 156 is preferably arranged at least 10 mm inward, more preferably at least 15 mm inward from the edges of the glass plates 11 and 12. This arrangement can reduce a risk of moisture penetrating through the edges of the glass plates 11 and 12 and causing corrosion of the electrode 156 and short-circuiting between different potentials.

A length of the electrode 156 is not particularly limited, but it is preferably 5 mm or more to ensure a sufficient energizing function and to improve operation. As described below, there may be a plurality of electrodes 156, and they may be arranged on the same side or facing each other on opposite sides.

A length w of an electrode 156 in a crosswise direction, that is, a width of an electrode 156, is preferably 3 mm to 20 mm, more preferably 4 mm to 15 mm, and even more preferably 4 mm to 10 mm. When the length w of the electrode 156 in the crosswise direction is 3 mm or more, the electrode 156 is easily handled. Further, a sufficient contact area between the conductive film 152 and 154 can be obtained, so that the electrode can fully demonstrate its function as an electrode. When the length w of the electrode 156 in the crosswise direction is 20 mm or less, concealment by a shielding layer 14 is easily made and the design is improved.

A thickness of an electrode 156 is preferably 0.05 mm to 0.4 mm. When the thickness of the electrode 156 is 0.05 mm or more, a sufficient strength can be obtained, and a failure such as disconnection can be reduced. When the thickness of the electrode 156 is 0.4 mm or less, a thickness difference between electrodes and the other parts is reduced. This makes it possible to suppress the stress generated in the glass plates 11 and 12, and the risk that the glass plates 11 and 12 may break can be reduced.

As shown in FIG. 1B, the light control element 15 includes an electrode section in which a given one of the electrodes 156 is formed and a non-electrode section in which none of the electrodes 156 is formed. An electrode section is a part that overlaps with the electrode 156 in planar view and does not include an inclined part around the electrode 156, that is, a part whose thickness decreases as the distance from the electrode 156 increases. Other parts except the electrode section are a non-electrode section.

The light control element 15 includes a first reference surface 158 and a second reference surface 159 which serve as a reference to define a height of an electrode section. The first reference surface 158 is a non-electrode section and is a surface forming a part of the light control element 15 with a substantially constant thickness and being in contact with the interlayer film 131 on the side facing the glass plate 11.

When the side facing to the glass plate 11 with respect to the first reference surface 158 is considered a positive direction, the height of the electrode section with respect to the first reference surface 158 can be either lower (a height in a negative direction) or higher than the first reference surface 158 (a height in a positive direction). However, what matters is not whether the direction of the height is positive or negative, but the magnitude of absolute values for the height of the electrode section with respect to the first reference surface 158. Therefore, in the following, an average value for the height of the electrode section with respect to the first reference surface 158 means an average value of absolute values for the height of the electrode section with respect to the first reference surface 158.

When the side facing to the glass plate 12 with respect to the second reference surface 159 is considered a positive direction, the height of the electrode section with respect to the second reference surface 159 can be either lower (a height in a negative direction) or higher than the second reference surface 159 (a height in a positive direction). However, what matters is not whether the direction of the height is positive or negative, but the magnitude of absolute values for the height of the electrode section with respect to the second reference surface 159. Therefore, in the following, an average value for the height of the electrode section with respect to the second reference surface 159 means an average value of absolute values for the height of the electrode section with respect to the second reference surface 159.

The part of the light control element 15 with substantially constant thickness excludes the inclined part around the electrode 156 in FIG. 1B in the non-electrode section and a recess 15x exposing a side wall of an electrode $156A_2$ in FIG. 3 as described below. Therefore, the inclined part around the electrode 156 and the recess 15x described below are not included in the first reference surface 158.

The second reference surface 159 is a non-electrode section and is a surface forming a part of the light control element 15 with a substantially constant thickness and being in contact with the interlayer film 132 on the side facing the glass plate 12. Therefore, the inclined part around the electrode 156 is not included in the second reference surface 159.

In FIG. 1B, an average value [mm] of the height (absolute value) of the electrode section with respect to the first reference surface 158 of the light control element 15 is denoted by t1, and an average value [mm] of the height (absolute value) of the electrode section with respect to the second reference surface 159 of the light control element 15 is denoted by t2. The length [mm] of the electrode 156 in the crosswise direction is denoted by w.

For the laminated glass 10, t1, t2, and w are determined so as to satisfy $0 \leq w \times t1 \leq 0.7$ and $0 \leq w \times t2 \leq 0.7$ (and also $3 \leq w \leq 20$)  Equation (1)

In other words, t1 and w are determined in such a way that a value [mm$^2$] obtained by multiplying the crosswise length w [mm] of the electrode 156 by the average value t1 [mm] of the height (absolute value) of the electrode section with respect to the first reference surface 158 is greater than or equal to 0 [mm$^2$] and less than or equal to 0.7 [mm$^2$] ($3 \leq w \leq 20$). Further, t2 and w are determined in such a way that a value obtained by multiplying the crosswise length w [mm] of the electrode 156 by the average value t2 [mm] of the height (absolute value) of the electrode section with respect to the second reference surface 159 is greater than or equal to 0 [mm$^2$] and less than or equal to 0.7 [mm$^2$].

If the length w of the electrode 156 in the crosswise direction is not constant ($3 \leq w \leq 20$), t1 and t2 are determined so as to satisfy Equation (1) for the average value of w.

As described in detail below, to obtain the laminated glass 10, a laminated body is prepared, for which a glass plate 11, an interlayer film 131, a light control element 15, an interlayer film 133, an interlayer film 132, and a glass plate 12 are sequentially laminated. The laminated body that has been prepared is placed in a rubber bag, for example, then heated and pre-pressure bonded while the inside of the rubber bag is decompressed by suction (degassing process). If necessary, the laminated body that has been pre-pressure bonded is placed in an autoclave, for example, then heated and pressurized for main bonding (main pressure bonding).

If thickness difference around an electrode is large as known before, the degassing property is deteriorated and appearance defects such as foaming and air residue occur in steps of manufacturing the laminated glass 10.

In contrast, when t1, t2, and w satisfy Equation (1) for the laminated glass 10, the thickness difference around an electrode decreases. Therefore, in the steps of manufacturing the laminated glass 10, degassing failure around the electrode can be reduced (evacuation of residual air can be improved), and the occurrence of the appearance defects such as foaming and air residue can be avoided.

It is preferable that t1, t2, and w satisfy Equation (1) (t1≤0.15 [mm] and t2≤0.15 [mm]). By satisfying this requirement, the degassing failure around an electrode is further reduced in the steps of manufacturing the laminated glass 10.

In the past, the relationship among a crosswise length of an electrode, a stepwise part generated between a non-electrode section and an electrode section, and the degassing property has not yet been studied. Specification by Equation (1) is based on new findings derived from the repeated studies by the inventors.

The glass plate 11, the glass plate 12, and the interlayer film 13 are described in detail below.

[Glass Plate]

The glass plate 11 and the glass plate 12 can be an inorganic glass or an organic glass. As inorganic glasses, for example, soda-lime glass, aluminosilicate glass, borosilicate glass, alkali-free glass, quartz glass, or the like can be used without any particular limitations. The glass plate 12 located outside of the laminated glass 10 is preferably an inorganic glass in terms of scratch resistance, and is preferably a soda-lime glass in terms of formability. When the glass plate 11 and the glass plate 12 are made of soda-lime glass, clear glass, green glass containing a predetermined amount or more of iron components, and UV-cut green glass can be preferably used.

The inorganic glass can be either an unreinforced glass or a reinforced glass. The unreinforced glass is made by forming molten glass into a plate and cooling it slowly. A compressive stress layer is formed on the surface of an unreinforced glass to make a reinforced glass.

The reinforced glass can be any kind of physically or chemically strengthened glass, for example, air-cooled reinforced glass. In the case of a physically strengthened glass, for example, a glass surface can be strengthened in such a way that a compressive stress layer is generated on the glass surface due to temperature difference between the glass surface and the glass interior by an operation other than slow cooling, such as rapidly cooling a uniformly heated glass plate in bent form from a temperature near the softening point.

In the case of a chemically strengthened glass, for example, the glass surface can be strengthened by generating compressive stress on the glass surface in an ion exchange method or the like after bending. A glass that absorbs ultraviolet or infrared rays may be used. Furthermore, although a transparent glass is preferable, a glass plate that is colored to an extent that transparency is not alleviated may be used.

Materials for an organic glass may include polycarbonate, acrylic resins such as polymethyl methacrylate, polyvinyl chloride, polystyrene, or other transparent resins.

The shapes of the glass plates 11 and 12 are not particularly limited to rectangular shapes, but may be processed into various shapes and curvatures. For bending of the glass plates 11 and 12, gravity molding, press forming, roller forming, or the like are used. The forming methods of the glass plates 11 and 12 are not particularly limited, but for example, in the case of inorganic glass, glass plates formed by the float method, etc. are preferable.

The thickness of the glass plate 12 is preferably greater than or equal to 1.1 mm and less than or equal to 3 mm at the thinnest part. When the thickness of the glass plate 12 is 1.1 mm or more, the glass plate 12 is strong enough to have resistance against flying stones. When the thickness is 3 mm or less, the mass of the laminated glass 10 is not too large, which is desirable in terms of fuel efficiency of a vehicle. The thickness of the glass plate 12 is preferably greater than or equal to 1.8 mm and less than or equal to 2.8 mm at the thinnest part, even more preferably greater than or equal to 1.8 mm and less than or equal to 2.6 mm, even more preferably greater than or equal to 1.8 mm and less than or equal to 2.2 mm, and even more preferably greater than or equal to 1.8 mm and less than or equal to 2.0 mm.

The thickness of the glass plate 11 is preferably greater than or equal to 0.3 mm and less than or equal to 2.3 mm. A thickness of 0.3 mm or more makes the glass plate 11 easy to handle, and when the thickness is 3 mm or less, the mass of the laminated glass 11 is not too large.

The shape of the glass plates 11 and 12 can be flat or curved. However, if the glass plates 11 and 12 are curved and the thickness of the glass plate 11 is not appropriate, and two glass plates 11 and 12 are formed with a particularly deep bend, a mismatch may be caused between the shapes of the two plates, which greatly affects the quality of the glass, such as residual stress after pressure bonding.

However, if the thickness of the glass plate 11 is greater than or equal to 0.3 mm and less than or equal to 2.3 mm, the glass quality such as residual stress can be maintained. The thickness of the glass plate 11 greater than or equal to 0.3 mm and less than or equal to 2.3 mm is particularly effective in maintaining glass quality in a glass with a deep bend. The thickness of the glass plate 11 is preferably greater than or equal to 0.5 mm and less than or equal to 2.1 mm, and more preferably greater than or equal to 0.7 mm and less than or equal to 1.9 mm. In this range, the above effects become even more apparent.

A film having functions such as water repellency, UV or IR cut, or a film with low reflection or low radiation properties may be provided on the outside of the glass plate 11 and/or 12. A film with UV or IR cut, a low radiation property, visible light absorption, coloration, etc. may also be provided on a side of the glass plate 11 and/or 12 that is in contact with the interlayer film 13.

If the glass plates 11 and 12 are made of curved inorganic glass, the glass plates 11 and 12 are bent after being formed by the float method and before bonding with the interlayer film 13. In bending, the glass is heated to be softened. The heating temperature of the glass during the bending is approximately 550° C. to 700° C.

[Interlayer Film]

For an interlayer film 13, thermoplastic resins are often used. Examples of thermoplastic resins that have been used for this type of application, may include plasticized polyvinyl acetal resin, plasticized polyvinyl chloride resin, saturated polyester resin, plasticized saturated polyester resin, polyurethane resin, plasticized polyurethane resin, ethylene-vinyl acetate copolymer resin, ethylene-ethyl acrylate copolymer resin, cycloolefin polymer resin, ionomer resin, and other thermoplastic resins. The resin compositions containing modified block copolymer hydrides disclosed in U.S. Pat. No. 6,065,221 may be preferably used.

Among these, the plasticized polyvinyl acetal resin is preferably used, because of its excellent balance in various performances such as transparency, weather resistance, strength, adhesive strength, penetration resistance, impact energy absorption property, moisture resistance, heat shielding property, and sound insulation property. These thermoplastic resins can be used alone or two or more thermoplastic resins can be used in combination. The term, "plasticize" used for the plasticized polyvinyl acetal resin means that it is plasticized by addition of a plasticizing agent. The same applies to other plasticized resins.

The light control element 15 enclosed in the interlayer film 13 may be deteriorated by a certain plasticizing agent, depending on the types of materials to be enclosed. In this case, it is preferable to use resins that substantially do not contain such a plasticizing agent. That is, in some cases, it can be preferable that an interlayer film 13 does not contain a plasticizing agent. Examples of resins that do not contain a plasticizing agent include ethylene-vinyl acetate copolymer resins.

The polyvinyl acetal resins include polyvinyl formal resin obtained by reacting polyvinyl alcohol (hereinafter referred to as "PVA", as appropriate) with formaldehyde, polyvinyl acetal resin in the narrow sense obtained by reacting PVA with acetaldehyde, polyvinyl butyral resin (hereinafter referred to as "PVB", as appropriate) obtained by reacting PVA with n-butyraldehyde, and the like. PVB is particularly preferred because of its excellent balance of various performances such as transparency, weather resistance, strength, adhesive strength, penetration resistance, impact energy absorption, moisture resistance, heat shielding property, and sound insulation property. These polyvinyl acetal resins may be used alone, or two or more polyvinyl acetal resins may be used in combination.

Material used to form an interlayer film 13 is not limited to thermoplastic resins. The interlayer film may also contain functional particles such as an IR absorber, a UV absorber, or a luminescent agent. The interlayer film 13 may also have a colored portion called a "shade band".

The thickness of the interlayer film 13 is preferably 0.5 mm or more at the thinnest part. When the thickness of the thinnest part of the interlayer film 13 is 0.5 mm or more, sufficient impact resistance for a laminated glass 10 is obtained. The thickness of the interlayer film 13 is preferably 3 mm or less at the thickest part. When the maximum thickness of the interlayer film 13 is 3 mm or less, the mass of the laminated glass 10 is not too large. The maximum value of the thickness of the interlayer film 13 is more preferably 2.8 mm or less, and even more preferably 2.6 mm or less.

The interlayer film 13 may have four or more layers. For example, the sound insulation property of the laminated glass 10 can be improved by forming the interlayer film with four or more layers and making the shear modulus of any one of the layers except the layers on both sides smaller than the shear modulus of the layers on both sides by adjusting the plasticizer or the like. In this case, the shear modulus of the layers on both sides may be the same or different.

It is desirable that all of the interlayer films 131, 132, and 133 included in the interlayer film 13 are made of the same material. However, some or all of the interlayer films 131, 132, and 133 may be made of different materials. For example, the shear modulus of the interlayer film 133 may be less than that of the interlayer films 131 and 132. When the shear modulus of the interlayer film 133 is smaller than the shear modulus of the interlayer films 131 and 132, the sound insulation property of the laminated glass 10 can be improved. Even though the shear modulus of the interlayer film 132 is smaller than the shear modulus of interlayer films 131 and 133, the sound insulation property of the laminated glass 10 can be improved. However, in terms of adhesiveness between the glass plates 11 and 12, or functional materials to be integrated into the laminated glass 10, it is desirable to use the above materials for at least 50% of the thickness of the interlayer film 13.

To manufacture an interlayer film 13, for example, the above resin materials for use as an interlayer film are appropriately selected and extruded in a heated and molten state by means of an extruder. Extrusion conditions such as extrusion speed of the extruder are uniformly set. Thereafter, an extruded resin film is stretched as appropriate, for example, to give curvature to the upper and lower edges in accordance with the design of the laminated glass 10. In this way, the interlayer film 13 is completed.

[Laminated Glass]

The entire thickness of the laminated glass 10 is preferably greater than or equal to 2.8 mm and less than or equal to 10 mm. When the entire thickness of the laminated glass 10 is 2.8 mm or more, sufficient rigidity can be ensured. If the entire thickness of the laminated glass 10 is 10 mm or less, sufficient transmittance can be obtained and haze can be reduced.

The plate misalignment between the glass plate 11 and the glass plate 12 on at least one side of the laminated glass 10 is preferably 1.5 mm or less, and more preferably 1 mm or less. Here, the plate misalignment between the glass plate 11 and the glass plate 12 refers to the amount of misalignment between the edge of the glass plate 11 and the edge of the glass plate 12 in planar view.

Preferably, the plate misalignment between the glass plate 11 and the glass plate 12 on at least one side of the laminated glass 10 is 1.5 mm or less, so that the appearance is not damaged. More preferably, the misalignment between the glass plate 11 and the glass plate 12 is 1.0 mm or less on at least one side of the laminated glass 10, so that the appearance is not damaged.

To manufacture the laminated glass 10, an interlayer film 13 and a light control element 15 are sandwiched between a glass plate 11 and a glass plate 12 to form a laminated body. The laminated body is then placed in a rubber bag and adhered at a temperature of about 70° C. to 110° C. in the vacuum with the gauge pressure of −65 kPa to −100 kPa. The heating conditions, temperature conditions, and lamination methods are appropriately selected in consideration of the properties of the light control element 15, for example, so that reduction of the light control element is not caused during a lamination process.

Furthermore, the laminated glass 10 with excellent durability can be obtained by a pressure bonding process with heating and pressurizing at a temperature of 100° C. to 150° C. and an absolute pressure of 0.6 MPa to 1.3 MPa. However, in some cases, this heating and pressurizing process may not be used in order to simplify the process steps, and also in consideration of the characteristics of the materials enclosed in the laminated glass 10.

In addition to the interlayer film 13 and the light control device 15, the glass plate 11 and the glass plate 12 may have therebetween, films or devices having functions such as an electric heating wire, infrared reflection, light emission, power generation, light control, a touch panel, visible light reflection, scattering, decoration, absorption, or the like to the extent that the effects of this application are not impaired. A film having functions such as antifogging, water repellency, heat shielding, and low reflection may be provided on the surface of the laminated glass 10. A film having functions such as heat shielding and heat generation may be provided on the surface of the glass plate 11 outside the vehicle and on the surface of the glass plate 12 inside the vehicle.

In this way, the thickness difference around the electrode is reduced for the laminated glass 10, since t1, t2, and w satisfy Equation (1). Therefore, in the steps of manufacturing the laminated glass 10, the degassing failure around the electrodes can be reduced (evacuation of residual air can be improved), and the occurrence of the appearance defects such as foaming and air residue can be avoided.

Variation 1 of the First Embodiment

Variation 1 of the first embodiment shows an example of a laminated glass with a light control element that has a different electrode structure from that of the first embodiment. In Variation 1 of the first embodiment, the explanations of the same components as in the embodiments that have already been described may be omitted.

Figure 2A:
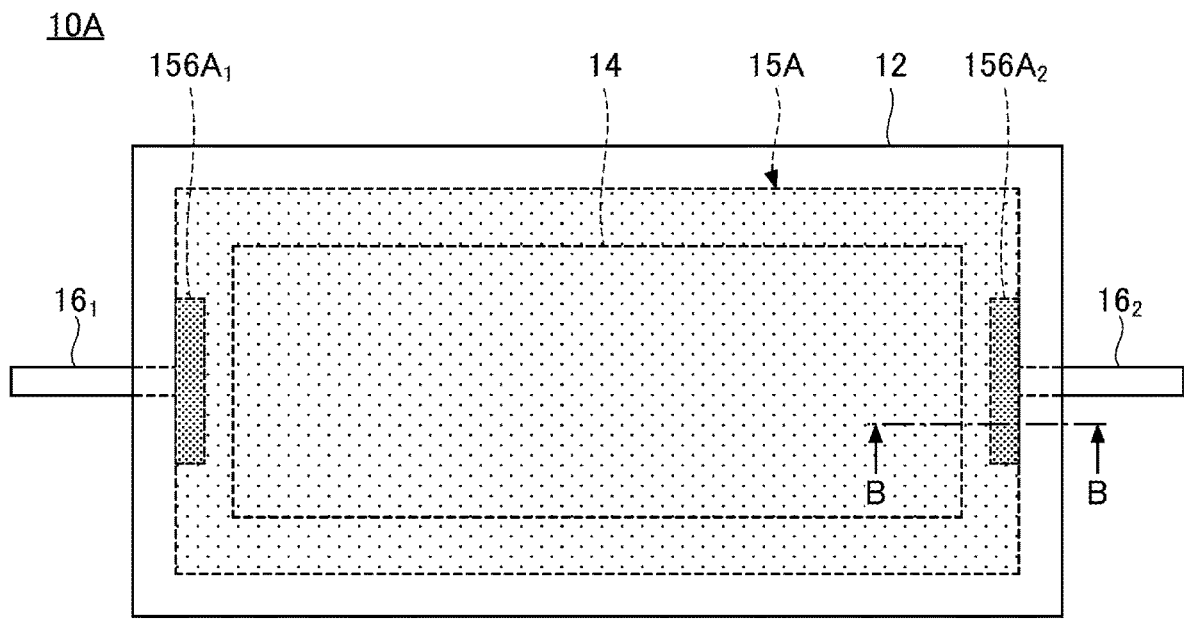
FIGS. 2A and 2B are drawings illustrating a laminated glass according to Variation 1 of the first embodiment.
Figure 2B:
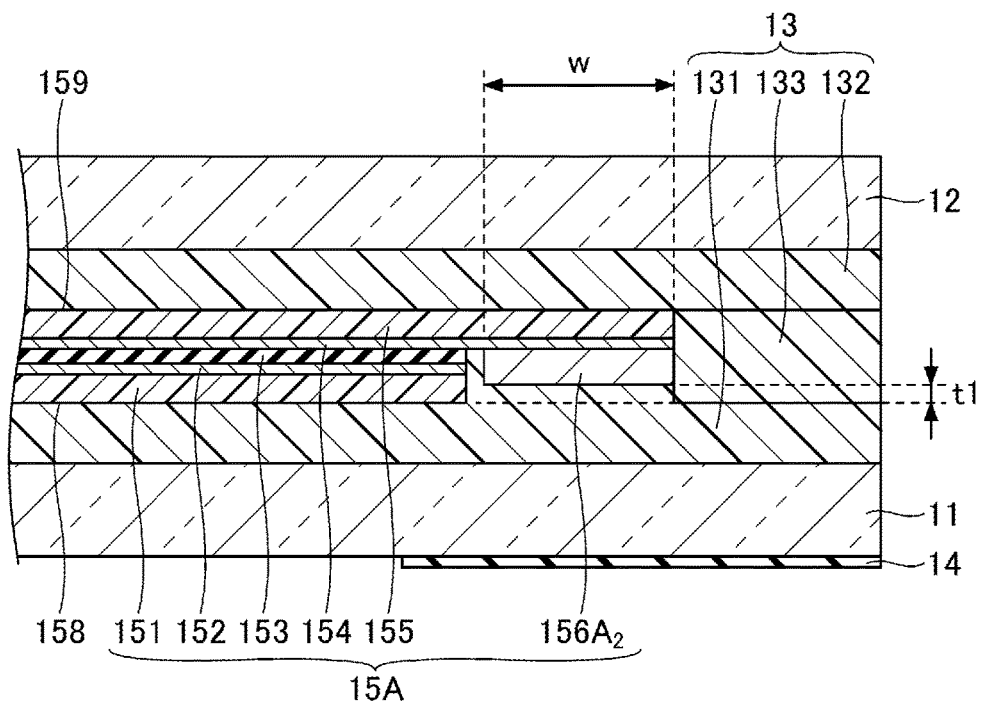

FIGS. 2A and 2B show an example of the laminated glass according to Variation 1 of the first embodiment. FIG. 2A schematically shows the laminated glass installed in the vehicle, viewing inside of the vehicle from outside of the vehicle. FIG. 2B is a partially enlarged cross-sectional view along line B-B in FIG. 2A.

Referring to FIGS. 2A and 2B, a laminated glass 10A differs from the laminated glass 10 (see FIGS. 1A and 1B) in that the light control element 15 is replaced by a light control element 15A.

Unlike the light control element 15 (see FIGS. 1A and 1B) having the single electrode 156, the light control element 15A includes a pair of electrodes $156A_1$ and $156A_2$. The light control element 15A has the same configuration as the light control element 15 except for the electrodes $156A_1$ and $156A_2$.

An electrode connection wiring $16_1$ is connected to an electrode $156A_1$ to connect the electrode $156A_1$ to an external circuit. An electrode connection wiring $16_2$ is connected to an electrode $156A_2$ to connect the electrode $156A_2$ to an external circuit.

The electrodes $156A_1$ and $156A_2$ are arranged at a position that overlaps with the shielding layer 14 in planar view, for example. The electrodes $156A_1$ and $156A_2$ are arranged on a half-cut part of the light control element 15A.

In detail, the electrode $156A_1$ is arranged in such a way that the first main surface of the electrode $156A_1$ is in contact with the surface of the conductive film 152 that is exposed after the substrate 155, conductive film 154, and light control layer 153 are partially removed. Further, the electrode $156A_2$ is arranged in such a way that the second main surface of the electrode $156A_2$ is in contact with the surface of the conductive film 154 that is exposed after the substrate 151, conductive film 152, and light control layer 153 are partially removed. The first main surface of the electrode $156A_2$ is in contact with the interlayer film 131. The first main surface of the electrodes $156A_1$ and $156A_2$ is the surface that faces the glass plate 11. The second main surface of the electrodes $156A_1$ and $156A_2$ is the opposite surface of the first main surface and faces the glass plate 12.

The electrode $156A_1$ is, for example, a positive electrode and is connected to the positive side of a power source such as a battery installed in a vehicle via the electrode connection wiring $16_1$. The electrode $156A_2$ is, for example, a negative electrode and is connected to the negative side of the power source such as the battery installed in the vehicle via the electrode connection wiring $16_2$.

When a voltage is supplied from a battery or other power sources to the light control layer 153 via electrodes $156A_1$ and $156A_2$, the transmittance of the light control layer 153 changes depending on the voltage.

The material, the length, the width, and the thickness of the electrodes $156A_1$ and $156A_2$, and the method of bonding with the conductive film, are the same as illustrated for the electrode 156 in the first embodiment.

The electrodes $156A_1$ and $156A_2$ are arranged approximately in parallel with the edges of the glass plates 11 and 12 on the both ends of the light control element 15A in the longitudinal direction (i.e., both short sides), as they are to be concealed with the shielding layer 14.

The electrodes $156A_1$ and $156A_2$ are preferably arranged 10 mm or more inside, and more preferably 15 mm or more inside of the edges of the glass plates 11 and 12. This arrangement reduces a risk of moisture penetrating through the edges of the glass plates 11 and 12 and causing corrosion of the electrodes $156A_1$ and $156A_2$ or short-circuiting between different potentials.

For the laminated glass 10A, t1, t2, and w are determined so as to satisfy Equation (1), as is the case with the laminated glass 10. However, the laminated glass 10A has no stepwise part on the side of the second reference surface 159, and t2=0. When the crosswise length of electrode $156A_1$ is denoted by w1, the crosswise length of electrode $156A_2$ is denoted by w2, and w1≠w2, each one of w1 and w2 satisfies Equation (1).

The connection between the electrode and the conductive film is not particularly limited, and an insertion type electrode as shown in FIGS. 1A and 1B, or a half-cut type electrode as shown in FIGS. 2A and 2B can be used.

In each case, the thickness difference around the electrodes is reduced when t1, t2, and w of the laminated glass satisfy Equation (1). Therefore, in the steps of manufacturing the laminated glass, degassing failure around the electrodes can be reduced (evacuation of residual air can be improved) and the occurrence of the appearance defects such as foaming and air residue can be avoided.

As is the case with the first embodiment, it is preferable that t1, t2, and w satisfy Equation (1) and also t1≤0.15 [mm]. By satisfying this requirement, the degassing defects around the electrodes is further reduced in the steps of manufacturing the laminated glass 10A.

However, when the half-cut type electrode is provided as in the laminated glass 10A, it is more preferably to satisfy t1≤0.15 [mm] and the requirements described below with reference to FIG. 3.

Figure 3:
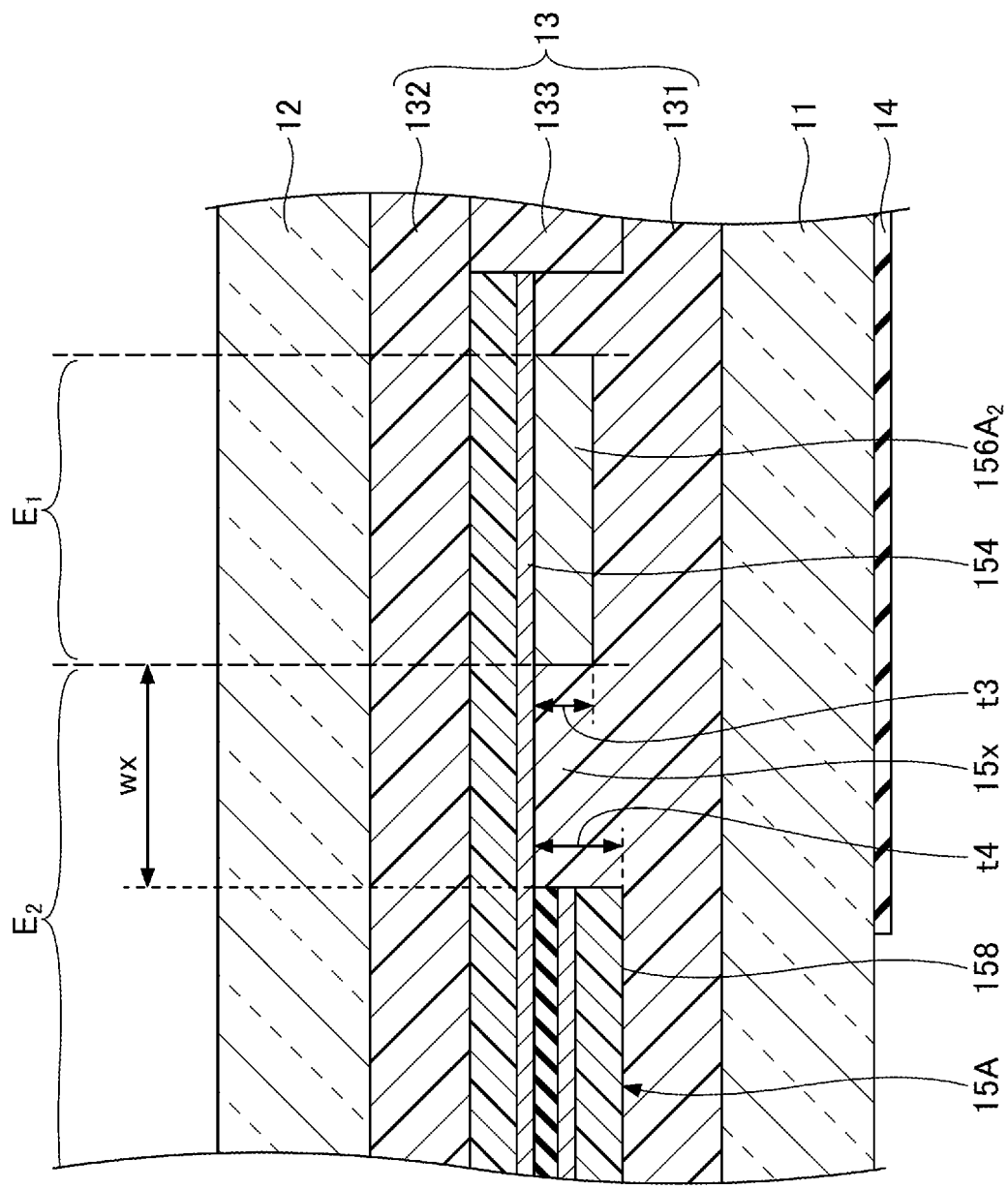
FIG. 3 is a drawing showing a recess formed on a non-electrode section.

FIG. 3 illustrates a recess that is formed on a non-electrode section. In FIG. 3, E1 denotes an electrode section and E2 denotes a non-electrode section.

The laminated glass 10A, having a half-cut type electrode, has a recess 15x that exposes a side wall of an electrode $156A_2$ on an end of the non-electrode section E2 facing the electrode section E1, in a vertical section extending parallel to the crosswise direction of the electrode $156A_2$, as shown in FIG. 3 (the same applies to the end of the electrode $156A_1$). The recess 15x is formed from the first reference surface 158 of the electrode section E2 toward the conductive film 154, and a bottom surface is formed by the conductive film 154.

In an example, with reference to the bottom of the recess 15x, at least one of a height t3 of a first side wall of the recess 15x that is the side wall of the electrode $156A_2$, or a height t4 of a second side wall opposite to the first side wall and on a side of the non-electrode section E2 is greater than 0.15 mm. In this case, it is preferable that the distance wx between the first and second side walls is small in terms of improvement of the degassing property. Specifically, if the distance wx between the first and second side walls is 5 mm or less, the effect on the degassing property is preferably less. If the distance wx between the first and second side walls is 3 mm or less, the effect on the degassing property is much less, and if the distance wx between the first and second side walls is 2 mm or less, the effect on the degassing property is preferably much less.

In another example, when the bottom of the recess $15x$ is a reference, both the height t3 of the first side wall (the side wall of the electrode $156A_2$) of the recess $15x$ and the height t4 of the second side wall opposite to the first side wall on the side of the non-electrode section E2 are greater than 0.15 mm. In this case, it is also preferable if the distance wx between the first and second side wall is small in terms of improving degassing. Specifically, if the distance wx between the first and second side walls is 5 mm or less, the effect on degassing is preferably less. If the distance wx between the first and second side walls is 3 mm or less, the effect on the degassing is much less, and if the distance wx between the first and second side walls is 2 mm or less, the effect on the degassing is preferably much less.

Variation 2 of the First Embodiment

Variation 2 of the first embodiment shows an example of the laminated glass with a light control element that has a different electrode arrangement from that of Variation 1 of the first embodiment. In Variation 2 of the first embodiment, the explanations of the same components as in the embodiments that have already been described may be omitted.

Figure 4:
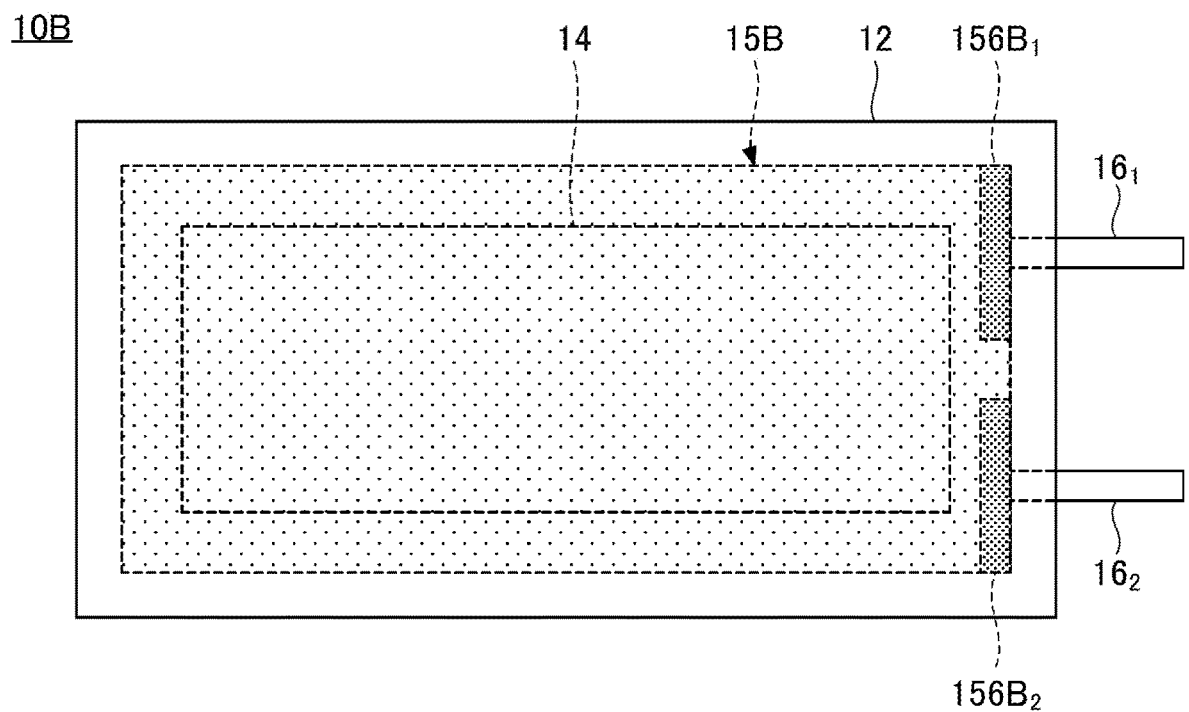
FIG. 4 is a plan view illustrating a laminated glass according to Variation 2 of the first embodiment.

FIG. 4 shows a plan view illustrating a laminated glass according to Variation 2 of the first embodiment. It schematically shows the laminated glass installed in a vehicle, viewing inside of the vehicle from outside of the vehicle.

Referring to FIG. 4, a laminated glass 10B differs from the laminated glass 10A (see FIGS. 2A and 2B) in that the light control element 15A is replaced by a light control element 15B.

Unlike the light control element 15A (see FIGS. 2A and 2B) including the pair of electrodes $156A_1$ and $156A_2$, the light control element 15B includes a pair of electrodes $156B_1$ and $156B_2$. The configuration of the light control element 15B is the same as the light control element 15A except for the electrodes $156B_1$ and $156B_2$.

An electrode connection wiring $16_1$ is connected to the electrode $156B_1$ to connect the electrode $156B_1$ to an external circuit. An electrode connection wiring $16_2$ is connected to the electrode $156B_2$ to connect the electrode $156B_2$ to an external circuit.

The material, the length, the width, and the thickness of the electrodes $156B_1$ and $156B_2$, and the method of bonding with the conductive film, are the same as illustrated for the electrode 156 in the first embodiment.

The electrodes $156B_1$ and $156B_2$ are arranged approximately in parallel with the edges of the glass plates 11 and 12 on one of the ends of the light control element 15B in the longitudinal direction (i.e., one of the short sides), as they are to be concealed with the shielding layer 14.

The electrodes $156B_1$ and $156B_2$ are preferably arranged 10 mm or more inside, and more preferably 15 mm or more inside of the edges of the glass plates 11 and 12. This arrangement reduces the risk of moisture penetrating through the edges of the glass plates 11 and 12 and causing corrosion of the electrodes $156B_1$ and $156B_2$ or short-circuiting between different potentials.

For the laminated glass 10B, t1, t2, and w are determined so as to satisfy Equation (1), as is the case with the laminated glass 10A. However, the laminated glass 10B has no stepwise part on the side of the second reference surface 159, and t2=0. When the crosswise length of electrode $156B_1$ is denoted by w1, the crosswise length of the electrode $156B_2$ is denoted by w2, and w1≠w2, each one of w1 and w2 satisfies Equation (1).

It is preferable that t1, t2, and w satisfy Equation (1), and also t1≤0.15 [mm]. By satisfying this requirement, the degassing defects around the electrodes is further reduced in the steps of manufacturing the laminated glass 10B.

As is the case with the laminated glass 10A, the laminated glass 10B has a recess that exposes a side wall of the one of the electrodes $1561B_1$ and $156B_2$ on an end of the non-electrode section facing the electrode-section, in a vertical section extending parallel to the crosswise direction of the one of the electrodes.

As is the case with the laminated glass 10A, when at least the height of the first side wall or the height of the second side wall of the recess is greater than 0.15 mm and if the distance between the first and second side walls is 5 mm or less, the effect on the degassing property is preferably less. If the distance between the first and second side walls is 3 mm or less, the effect on the degassing is preferably less, and if the distance between the first and second side walls is 2 mm or less, the effect on the degassing is preferably much less.

When both the height of the first side wall and the second side wall of the recess are greater than 0.15 mm, and if the distance between the first and second side walls is 5 mm or less, the effect on the degassing property is preferably less. If the distance between the first and second side walls is 3 mm or less, the effect on the degassing property is preferably much less, and if the distance between the first and second side walls is 2 mm or less, the effect on the degassing property is preferably much less.

The pair of electrodes can be arranged on the edges of the glass plates 11 and 12 opposed to each other, or arranged in line at a predetermined distance on the same edge of the glass plates 11 and 12.

In each case, the thickness difference around the electrodes is reduced when t1, t2, and w of the laminated glass satisfy Equation (1). Therefore, in the steps of manufacturing the laminated glass, degassing failure around the electrodes can be reduced (evacuation of residual air can be improved) and the occurrence of the appearance defects such as foaming and air residue can be avoided.

Variation 3 of the First Embodiment

Variation 3 of the first embodiment shows an example of the laminated glass with a light control element that has a different electrode arrangement from that of Variation 1 of the first embodiment. In Variation 3 of the first embodiment, the explanations of the same components as in the embodiments that have already been described may be omitted.

Figure 5:
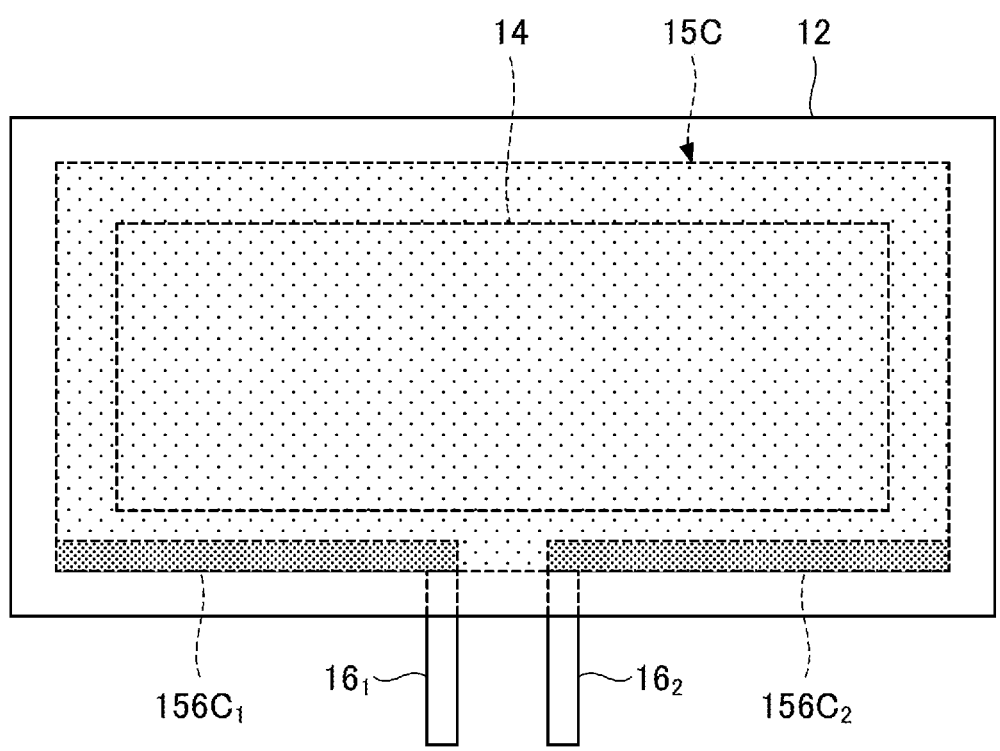
FIG. 5 is a plan view illustrating a laminated glass according to Variation 3 of the first embodiment.

FIG. 5 shows a plan view illustrating the laminated glass according to Variation 3 of the first embodiment. It schematically shows the laminated glass installed in a vehicle, viewing inside of the vehicle from outside of the vehicle.

Referring to FIG. 5, a laminated glass 10C differs from the laminated glass 10A (see FIGS. 2A and 2B) in that the light control element 15A is replaced by a light control element 15C.

Unlike the light control element 15A (see FIGS. 2A and 2B) including the pair of electrodes $156A_1$ and $156A_2$, the light control element 15C includes a pair of electrodes $156C_1$ and $156C_2$. The configuration of the light control element 15C is the same as the light control element 15A except for the electrodes $156C_1$ and $156C_2$.

An electrode connection wiring $16_1$ is connected to the electrode $156C_1$ to connect the electrode $156C_1$ to an external circuit. An electrode connection wiring $16_2$ is connected to the electrode $156C_2$ to connect the electrode $156C_2$ to an external circuit.

The material, the length, the width, and the thickness of the electrodes $156C_1$ and $156C_2$, and the method of bonding with the conductive film, are the same as illustrated for the electrode 156 in the first embodiment.

The electrodes $156C_1$ and $156C_2$ are arranged approximately in parallel with the edges of the glass plates 11 and 12 on one of the ends of the light control element 15C in the crosswise direction (i.e., one of the long sides), as they are to be concealed with the shielding layer 14.

The electrodes $156C_1$ and $156C_2$ are preferably arranged 10 mm or more inside, and more preferably 15 mm or more inside of the edges of the glass plates 11 and 12. This arrangement reduces a risk of moisture penetrating through the edges of the glass plates 11 and 12 and causing corrosion of the electrodes $156C_1$ and $156C_2$ or short-circuiting between different potentials.

For the laminated glass 10C, t1, t2, and w are determined so as to satisfy Equation (1), as is the case with the laminated glass 10C. However, the laminated glass 10B has no stepwise part on the side of the second reference surface 159, and t2=0. If the crosswise length of electrode $156C_1$ is denoted by w1, the crosswise length of electrode $156C_2$ is denoted by w2, and w1≠w2, each of w1 and w2 satisfies Equation (1).

As is the case with the first embodiment, it is preferable that t1, t2, and w satisfy Equation (1), and also t1≤0.15 [mm]. By satisfying this requirement, the degassing defects around the electrodes are further reduced in the steps of manufacturing the laminated glass 10C.

As is the case with the laminated glass 10A, the laminated glass 10C has a recess that exposes a side wall of one of the electrodes $156C_1$ and $156C_2$ on an end of the non-electrode section facing the electrode section, in a vertical section extending parallel to the crosswise direction of the one of the electrodes.

As is the case with the laminated glass 10A, when at least the height of the first side wall or the height of the second side wall of the recess is greater than 0.15 mm, and if the distance between the first and second side walls is 5 mm or less, the effect on the degassing property is preferably less. If the distance between the first and second side walls is 3 mm or less, the effect on the degassing property is preferably less, and if the distance between the first and second side walls is 2 mm or less, the effect on the degassing property is preferably much less.

When both the height of the first side wall and the second side wall of the recess are greater than 0.15 mm, and if the distance between the first and second side walls is 5 mm or less, the effect on degassing is preferably less. If the distance between the first and second side walls is 3 mm or less, the effect on the degassing is preferably much less, and if the distance between the first and second side walls is 2 mm or less, the effect on the degassing is preferably much less.

In this way, the pair of electrodes can be arranged opposed to each other on both ends of the light control element in the longitudinal direction, or arranged in line at a predetermined distance on one of the ends of the light control element in the longitudinal direction. Further, the pair of electrodes can be arranged in line at a predetermined distance on one of the ends of the light control element in the crosswise direction.

In each case, the thickness difference around the electrodes is reduced when t1, t2, and w of the laminated glass satisfy Equation (1). Therefore, in the steps of manufacturing the laminated glass, degassing failure around the electrodes can be reduced (evacuation of residual air can be improved) and the occurrence of the appearance defects such as foaming and air residue can be avoided.

Variation 4 of the First Embodiment

Variation 4 of the first embodiment shows an example of the laminated glass with an electric heating element. In Variation 4 of the first embodiment, explanations of the same components as in the embodiments that have already been described may be omitted.

Figure 6A:
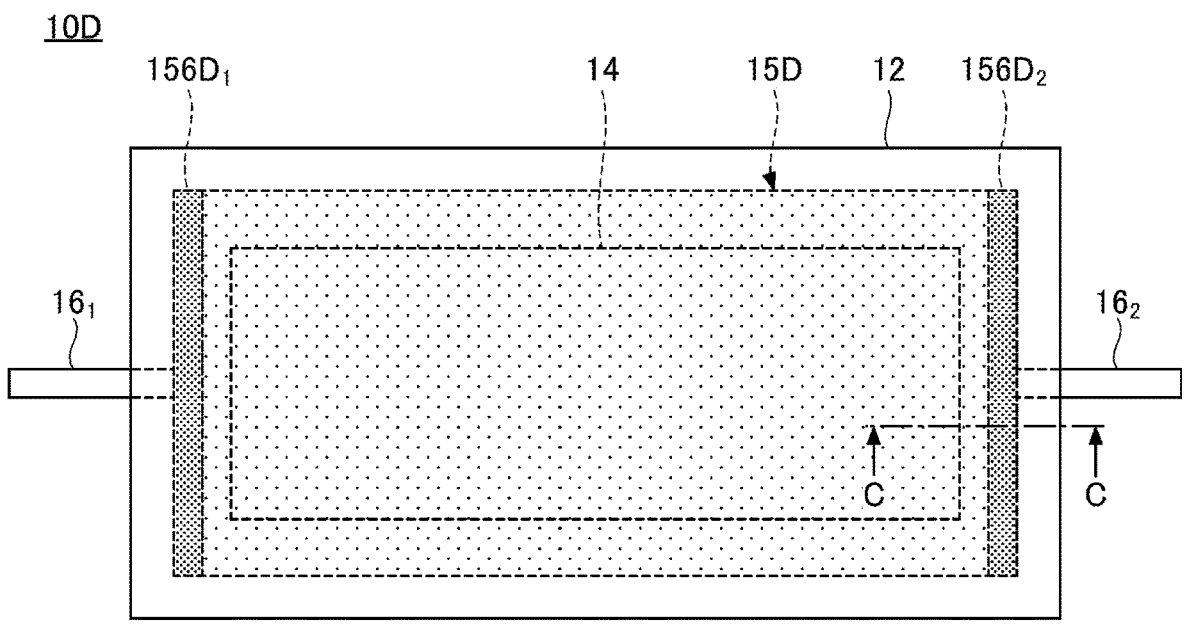
FIGS. 6A and 6B are drawings illustrating a laminated glass according to Variation 4 of the first embodiment.
Figure 6B:
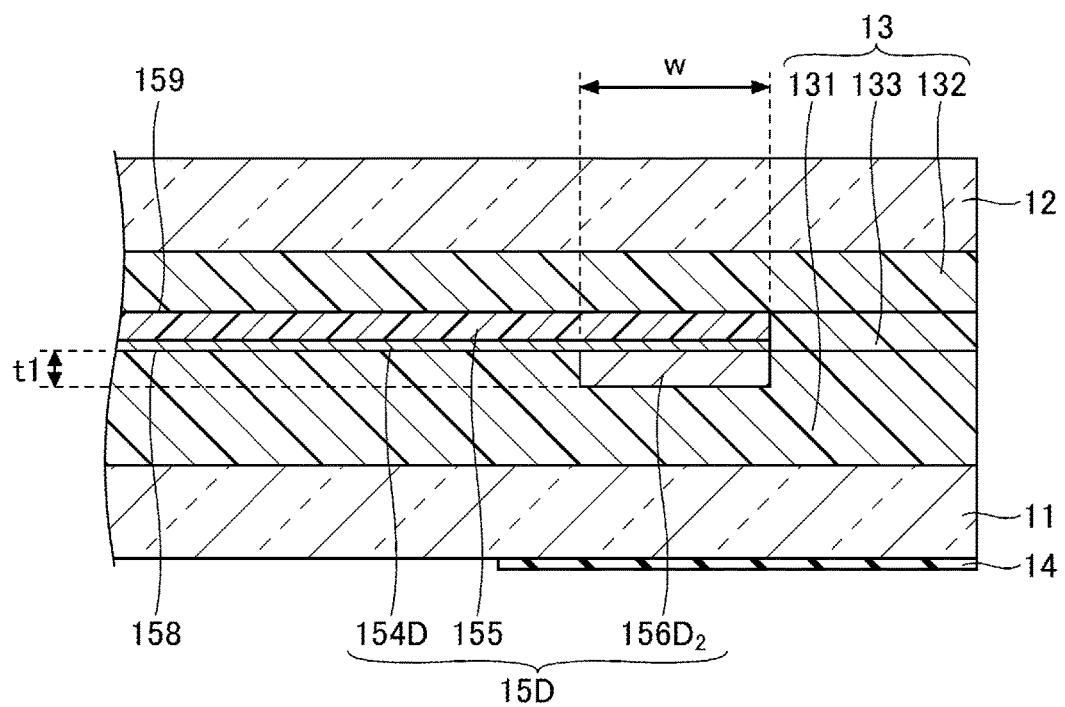

FIGS. 6A and 6B show the laminated glass according to Variation 4 of the first embodiment. FIG. 6A is a schematic view of the laminated glass installed in a vehicle, viewing inside of the vehicle from outside of the vehicle. FIG. 6B is a partially enlarged cross-sectional view taken along line C-C of FIG. 6A.

Referring to FIGS. 6A and 6B, the laminated glass 10D differs from the laminated glass 10A (see FIGS. 2A and 2B) in that the light control element 15A is replaced by an electric heating element 15D.

The electric heating element 15D is an element that can heat the laminated glass 10D. The electric heating element 15D can be arranged approximately on the entire laminated glass 10D, or only a part of it. The electric heating element 15D has, for example, a rectangular form in a plan view. An edge of the electric heating element 15D is arranged at a position at which it overlaps the shielding layer 14 in a planer view.

The electric heating element 15D is formed as a film including a substrate 155, a heat generating part 154D, and electrodes $156D_1$ and $156D_2$, and enclosed in the interlayer film 13. In other words, the electric heating element 15D is surrounded by the interlayer film 13.

The heat generating part 154D can be formed, for example, by a conductive film such as gold, silver, copper, tin-doped indium oxide, or the like. The heat generating part 154D can be formed, for example, using a physical vapor deposition (PVD) such as sputtering, vacuum deposition or ion plating. The heat generating part 154D can also be formed, using a chemical vapor deposition (CVD) or a wet coating method.

An electric heating wire or a mesh-like metal may be used as the heat generating part 154D. The material used for an electric heating wire or a mesh-like metal is not particularly limited as long as the material is a conductive material, but include at least one metal selected from a group consisting of gold, silver, copper, aluminum, nickel, and tungsten, or an alloy containing two or more metals selected from this group, or the like.

An electrode connection wiring $16_1$ is connected to the electrode $156D_1$ to connect the electrode $156D_1$ to an external circuit. An electrode connection wiring $16_2$ is connected to the electrode $156D_2$ to connect the electrode $156D_2$ to an external circuit.

The first main surface of electrodes $156D_1$ and $156D_2$ is in contact with the interlayer film 131. The second main surface of electrodes $156D_1$ and $156D_2$ is in contact with the surface of the heat generating part 154D. The first main surface of the electrodes $156D_1$ and $156D_2$ is the surface that faces the glass plate 11. The second main surface of the electrodes 156D₁ and 156D₂ is the opposite surface of the first main surface and the surface that faces the glass plate 12.

The electrode 156D₁ is, for example, a positive electrode and is connected to the positive side of a power source such as a battery installed in the vehicle via the electrode connection wiring 16₁. The electrode 156D₁ is, for example, a negative electrode and is connected to the negative side of the power source such as a battery installed in the vehicle via the electrode connection wiring 16₂.

When voltage is supplied from the power source such as a battery to the heat generating part 154D via the electrodes 156D₁ and 156D₂, an amount of heat generated by the heat generating part 154D varies depending on the voltage. When heat is generated by the heat generating part 154D, the effects such as melting frozen water adhering to the laminated glass 10D (ice melting) or clearing fogging (antifogging) are obtained.

The material, the length, the width, and the thickness of the electrodes 156D₁ and 156D₂, and the method of bonding with the conductive film, are the same as illustrated for the electrode 156 in the first embodiment.

The electrodes 156D₁ and 156D₂ are arranged approximately in parallel with the edges of the glass plates 11 and 12 on the both ends of the light control element 15C in the longitudinal direction (i.e., both short sides), as they are to be concealed with the shielding layer 14.

Since the electric heating element 15D requires uniform current distribution, as shown in FIG. 5a, it is preferable that the electrodes 156D₁ and 156D₂ are arranged over the entire area of the sides of the electric heating element 15D. In the case of a functional element such as a light control element 15 that functions by application of voltage, the electrodes may be arranged only on a part of the sides, as shown in FIG. 2A, etc.

The electrodes 156D₁ and 156D₂ are preferably arranged 10 mm or more inside, and more preferably 15 mm or more inside of the edges of the glass plates 11 and 12. This arrangement reduces a risk of moisture penetrating through the edges of the glass plates 11 and 12 and causing corrosion of the electrodes 156D₁ and 156D₂ or short-circuiting between different potentials.

For the laminated glass 10D, t1, t2, and w are determined so as to satisfy Equation (1), as is the case with the laminated glass 10D. However, the laminated glass 10D has no stepwise part on the side of the second reference surface 159, and t2=0. When the crosswise length of electrode 156B₁ is denoted by w1, the crosswise length of electrode 156B₂ is denoted by w2, and w1≠w2, each one of w1 and w2 satisfies Equation (1).

As is the case with the first embodiment, it is preferable that t1, t2, and w satisfy Equation (1), and also t1≤0.15 [mm]. By satisfying this requirement, the degassing defects around the electrodes are further reduced in the steps of manufacturing the laminated glass 10D.

As described above, in the laminated glass, the functional elements to be enclosed in the interlayer film are not limited to the light control elements, but can be, for example, the electric heating elements. In the case of an electric heating element enclosed in the interlayer film of the laminated glass, the thickness difference around the electrodes is reduced when t1, t2, and w of the laminated glass satisfy Equation (1). Therefore, in the steps of manufacturing the laminated glass, degassing failure around the electrodes can be reduced (evacuation of residual air can be improved) and the occurrence of the appearance defects such as foaming and air residue can be avoided.

In addition to a light control element and an electric heating element, functional elements that can be enclosed in the interlayer of the laminated glass include an organic electro-luminescence (OEL), an inorganic electroluminescence, a light emitting diode (LED), a liquid crystal display element, a solar cell and other elements manufactured on or bonded to the substrate.

In the case of these functional elements enclosed in the interlayer film of the laminated glass, the thickness difference around the electrodes is reduced when t1, t2, and w of the laminated glass satisfy Equation (1). Therefore, in the steps of manufacturing the laminated glass, degassing failure around the electrodes can be reduced (evacuation of residual air can be improved) and the occurrence of the appearance defects such as foaming and air residue can be avoided.

Figure 7:
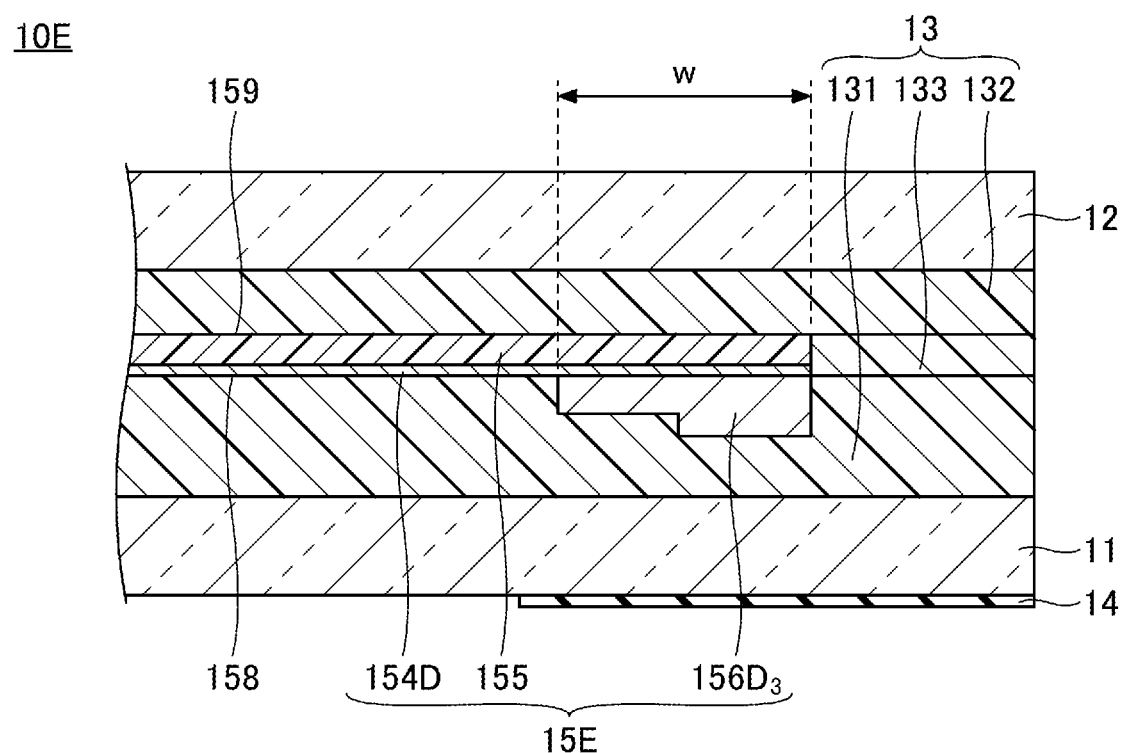
FIG. 7 is a drawing illustrating a laminated glass according to Variation 5 of the first embodiment.
Figure 8:
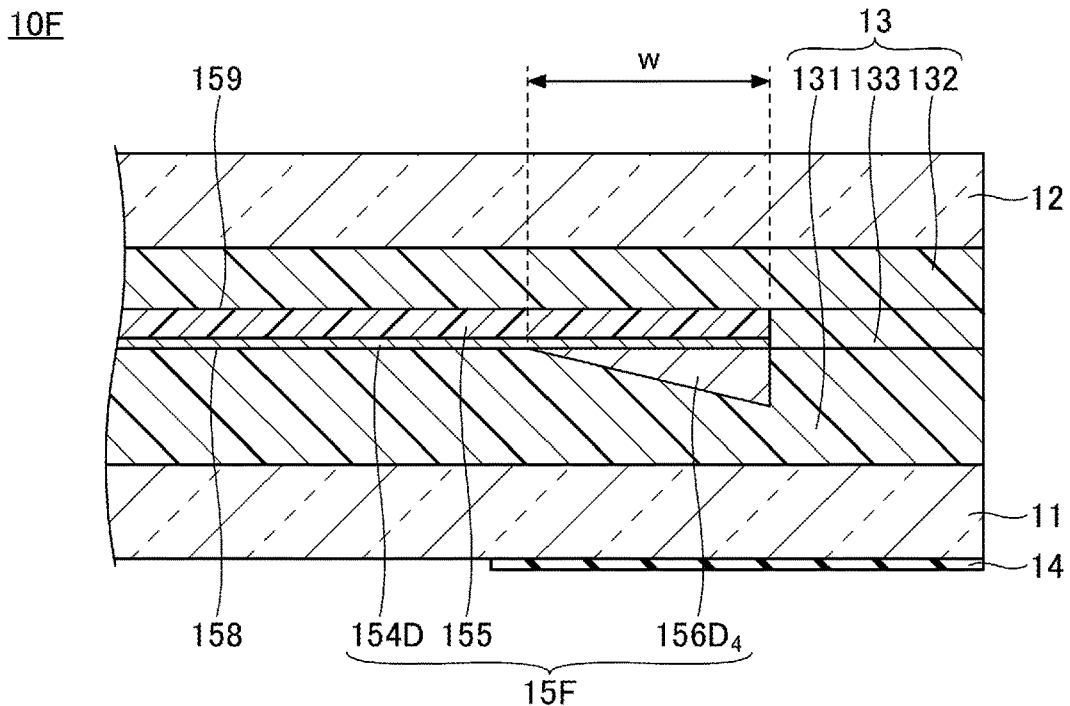
FIG. 8 is a drawing illustrating a laminated glass according to Variation 6 of the first embodiment.
Figure 9:
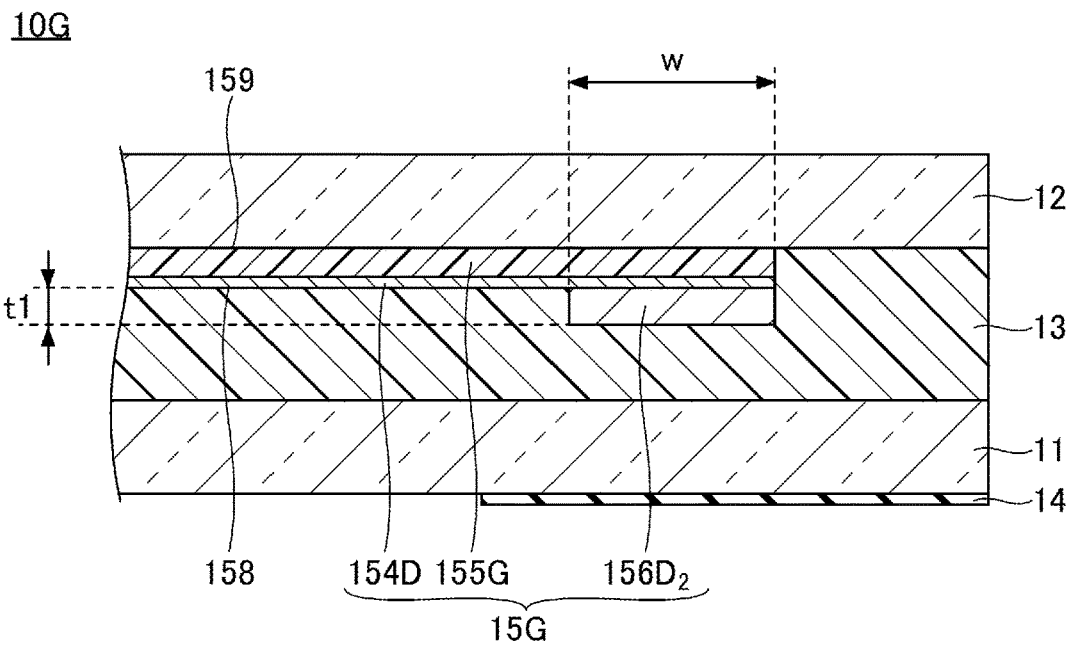
FIG. 9 is a drawing illustrating a laminated glass according to Variation 7 of the first embodiment.

A laminated glass 10D shown in FIGS. 6A and 6B can be modified as the laminated glass 10E shown in FIG. 7, the laminated glass 10F shown in FIG. 8, or the laminated glass 10G shown in FIG. 9.

An electric heating element 15E of a laminated glass 10E shown in FIG. 7 has an electrode 156D3 that is shaped stepwise from the inside to the outside of the electric heating element 15E. An electric heating element 15F of the laminated glass 10F shown in FIG. 8 has an electrode 156D₄ with wedge-shaped inclination from the inside to the outside of the electric heating element 15F.

In a laminated glass 10G shown in FIG. 9, a substrate 155G of an electric heating element 15G also functions as an interlayer, and is directly bonded to the glass plate 12 on the side of the second reference surface 159 of the substrate 155G. The substrate 155G is bonded to the glass plate 11 via the interlayer film 13 on the side of the second reference surface 158 of the substrate 155G. When the substrate 155G of the electric heating element 15G also functions as an interlayer film, the materials illustrated for the interlayer film, such as PVB, can be used as a material for the substrate 155G.

For each of the laminated glasses 10E, 10F, 10G, the same effect as the laminated glass 10D is achieved when t1, t2 and w satisfy Equation (1).

EXAMPLES OF EMBODIMENTS

Examples of embodiments and comparative examples are described below. However, the present disclosure is not limited in any way to these examples. Among these examples, Examples 1, 3, 5, 7, 9, 11, and 12 are the examples of embodiments, and Examples 2, 4, 6, 8, 10, and 13 are the comparative examples.

Example 1

A glass plate for an interior glass plate of a laminated glass (a glass plate inside the vehicle) and a glass plate for an exterior glass plate (a glass plate outside the vehicle) were prepared (Manufactured by AGC, known as "VFL"). Each of the glass plate inside the vehicle and the glass plate outside the vehicle had a dimension of 300 mm (length)×300 mm (width)×2 mm (thickness of a plate).

Subsequently, a polyethylene terephthalate film (PET film) measuring 220 mm (length)×220 mm (width) for use as a functional element was prepared. A PET film for use as an electrode was fixed along an edge of the PET film for use as a functional element. The size of each part of the PET film for use as an electrode was adjusted so that t1, t2, and w had the values shown in the column of Example 1 in FIG. 10 (In each example of embodiment, t2=0).

Subsequently, two interlayer films (manufactured by Solutia Japan, PVB, 0.38 mm thick) are prepared. Then, one of the interlayer films, the PET film for use as a functional element, and the other one of the interlayer films are inserted in this order between the interior glass plate and the exterior glass plate to manufacture a laminated body. The position of the PET film for use as a functional element was adjusted so that the distance from an end of the glass plate to an end of the PET film was 40 mm.

Thereafter, for example, the laminated body was placed in a rubber bag and adhered at a temperature of about 70° C. to 110° C. in the vacuum with a gauge pressure of −65 kPa to −100 kPa. Then, the laminated body was heated and pressurized under the condition at a temperature of 100° C. to 150° C. and with an absolute pressure of 0.6 MPa to 1.3 MPa. Two types of laminated glasses for evaluation with a PET film for use as an electrode were manufactured: one with a PET film having a length of 100 mm and the other with a PET film having a length of 50 mm.

Examples 2 to 10

The Laminated glasses for evaluation were manufactured as in Example 1, except that the size of each part of the PET film for use as an electrode was adjusted so that t1, t2, and w had the values shown in the column of Examples 2 to 10 in FIG. 10. As in Example 1, two types of laminated glasses with a PET film for use as an electrode were produced for evaluation: one with a PET film having a length of 100 mm and the other with a PET film having a length of 50 mm.

Examples 11 to 13

As a functional element, an SPD film (manufactured by Hitachi Chemical) with a thickness of 90 μm was used, and as an electrode, a copper tape with a thickness of 70 μm was used. On one side of an electrode, the SPD film is half-cut to expose a transparent conductive film to which the copper film is adhered. Two types of gap of 3 mm (Example 11) and 5 mm (Examples 12, 13) are made between the copper tape and the SPD film. The height of the electrode was set in two ways: 70 μm (Examples 11 and 12) and 210 μm (Example 13). An electrode with the height of 210 μm is made by overlaying three copper tapes of 70 μm. In other aspects, the laminated glasses for evaluation are manufactured as in Example 1. As in Example 1, two types of laminated glass for evaluation are manufactured: one with a 100 mm long electrode and the other with a 50 mm long electrode (In each example of embodiment, t2=0).

EVALUATION

For each of the laminated glasses for evaluation manufactured in Examples 1 to 13, it was confirmed whether foaming and air residue were present in the interlayer film.

As an evaluation method, a bake test was conducted for the laminated glasses for evaluation (at 120°, for two hours). After the bake test, it was visually confirmed whether foaming and air residue were present in the interlayer film. A laminate glass was to be poor or "rejected" if foaming and air residue were confirmed in the interlayer film, and was to be good or "acceptable" if no foaming and air residue were confirmed in the interlayer film.

FIG. 10 shows an evaluation result along with the values of t1, t2, and w for a PET film for use as an electrode. FIG. 11 shows another evaluation result along with the values of t1, t2, t3, t4, w, and wx for a copper tape actually used as an electrode. The length of the PET film for use as an electrode is not shown in FIG. 10, since the evaluation results were exactly the same for the two types of 100 mm and 50 mm. The length of the copper tape for use as an electrode is not shown in FIG. 11, since the evaluation results were exactly the same for the two types of 100 mm and 50 mm.

As shown in FIGS. 10 and 11, when w×t1 was 0.375, 0.42, 0.5, 0.625, and 0.7, no foaming or air residue was confirmed in the interlayer film, and the evaluation result was good or "acceptable". However, when w×t1 was 0.75, 0.875, 1, 1.25, 1.26, or 1.3, foaming or air residue was confirmed in the interlayer film, and the evaluation result was poor or "rejected".

From this result, it can be seen that if t1 and w satisfy 0≤w×t1≤0.7 (and also 3≤w≤20), degassing failure around the electrode can be reduced (evacuation of residual air can be improved), and the generation of foaming or air residue in the interlayer film can be prevented.

Since the effect on degassing is considered to be equivalent on both t1 and t2 sides, if t2 is not equal to 0, and t2 and w satisfy 0≤w×t2≤0.7 (and also 3≤w≤20), degassing failure around the electrode can be reduced (evacuation of residual air can be improved), and foaming or air residue in the interlayer film can be prevented.

As shown in FIG. 11, when t1 is 0.07 mm, t2 is 0 mm, t3 is 0.07 mm and t4 is 0.22 mm, and wx is 3 mm or 5 mm, no foam or air residue was confirmed in the interlayer film, and the evaluation result was good or "acceptable." However, when t1 was 0.21 mm, t2 was 0 mm, t3 was 0.21 mm, t4 was 0.22 mm, and wx was 5 mm, foaming or air residue was confirmed in the interlayer film, and the evaluation result was poor or "rejected".

From this result, it can be said that if at least one of the following (1) and (2) is satisfied in the half-cut type electrode, the degassing failure around the electrode can be reduced (evacuation of residual air can be improved) and the generation of foaming or air residue in the interlayer film can be prevented.

(1) t1≤0.15 [mm], and t2≤0.15 [mm]
(2) At least one of t3 and t4 is greater than 0.15 mm and wx≤5 [mm].

Preferred embodiments are described in detail in the above. Further, the present disclosure is not limited to these embodiments, but various modifications and replacements may be made without departing from the scope of the present disclosure.

What is claimed is:

1. A laminated glass, comprising:
   a pair of glass plates;
   an interlayer film formed between the pair of glass plates; and
   a functional element formed between the pair of glass plates and in contact with the interlayer film and including at least one conductive film and at least one electrode electrically connected to the conductive film such that the functional element has an electrode section in which one of the electrodes is formed, and a non-electrode section in which none of the electrodes is formed, wherein the functional element has a first reference surface and a second reference surface in the non-electrode section, the first reference surface is in contact with the interlayer film where one of the pair of glass plates is formed, and the second reference surface is in contact with the interlayer film where the other of the pair of glass plates is formed, the electrode section satisfies $0 \leq w \times t1 \leq 0.7$, $0 \leq w \times t2 0.7$, and $3 \leq w \leq 20$, where t1 in mm is an average value of a height of the electrode section with respect to the first reference surface, t2 in mm is an average value of a height of the electrode section with respect to the second reference surface, and w is a length in mm in a crosswise direction of the one of the electrodes, the functional element is a light control element or an electric heating element, and the light control element includes substrates formed in an opposing fashion and on which conductive films are formed, and a light control layer formed between the opposing substrates and comprising at least one selected from the group consisting of a suspended particle device, a guest-host liquid crystal, a photochromic material, an electrochromic material, and an electrokinetic material, wherein t1 and t2 satisfy $t1 \leq 0.15$ mm and $t2 \leq 0.15$ mm, and wherein the non-electrode section has an end portion which faces the electrode section and has a recess in a vertical section extending parallel to the crosswise direction of the one of the electrodes, wherein, with reference to a bottom of the recess, at least one of a height of a first side wall of the recess that is the side wall of the one of the electrodes, or a height of a second side wall opposite to the first side wall and on a side of the non-electrode section is greater than 0.15 mm, and a distance between the first side wall and the second side wall is 5 mm or less in a direction parallel to the crosswise direction of the one of the electrodes.

2. The laminated glass according to claim 1, wherein, with reference to bottom of the recess, both the height of the first side wall of the recess that is the side wall of the one of the electrodes, and the height of the second side wall opposite to the first side wall and on the side of the non-electrode section is greater than 0.15 mm, and the distance between the first side wall and the second side wall is 5 mm or less in the direction parallel to the crosswise direction of the one of the electrodes.

3. The laminated glass according to claim 1, wherein the one of the electrodes has a length in a longitudinal direction of 5 mm or more.

4. The laminated glass according to claim 1, wherein a first main surface facing one of the pair of glass plates and a second main surface opposite from the first main surface of the one of the electrodes are in contact with a film other than the interlayer film.

5. The laminated glass according to claim 1, wherein a first main surface facing one of the pair of glass plates or a second main surface opposite from the first main surface of the one of the electrodes is in contact with the interlayer film.

6. The laminated glass according to claim 1, wherein the functional element has a thickness of from 0.05 mm to 0.5 mm.

7. The laminated glass according to claim 1, wherein the electrodes comprise at least one of gold, silver, copper, aluminum, tungsten, platinum, palladium, nickel, cobalt, titanium, iridium, zinc, magnesium, and tin.

8. The laminated glass according to claim 1, wherein the electrodes are bonded to the conductive films by a conductive adhesive, an anisotropic conductive film, or a solder.

9. The laminated glass according to claim 1, wherein the electrodes are formed at least 10 mm inside of edges of the pair of glass plates.

10. The laminated glass according to claim 1, wherein the substrates comprise transparent resin layers.

11. The laminated glass according to claim 10, wherein the transparent resin layers comprise at least one selected from the group consisting of polyethylene terephthalate, polyethylene naphthalate, polyamide, polyether polysulfone, polyethersulfone, polycarbonate, polyarylate, polyetherimide, polyetheretherketone, polyimide, aramid, polybutylene terephthalate, triacetyl cellulose, polyurethane, and a cycloolefin polymer.

12. The laminated glass according to claim 1, wherein the at least one conductive film comprises a transparent conductive oxide.

13. The laminated glass according to claim 1, further comprising:
a shielding layer formed at a position overlapping with the at least one electrode.

14. The laminated glass according to claim 1, wherein the non-electrode section of the light control element has a constant thickness.

15. The laminated glass according to claim 1, wherein the interlayer film comprises a thermoplastic resin.

16. The laminated glass according to claim 15, wherein the thermoplastic resin comprises a plasticized polyvinyl acetal resin.

17. The laminated glass according to claim 1, wherein the distance between the first side wall and the second side wall is 3 mm or less.

18. The laminated glass according to claim 1, wherein the distance between the first side wall and the second side wall is 2 mm or less.

* * * * *